United States Patent [19]
Young

[11] Patent Number: 5,988,659
[45] Date of Patent: Nov. 23, 1999

[54] PORTABLE PANEL LIFT DEVICE

[76] Inventor: Roland O. Young, R.R. #1, P.O. Box 138, Grand Forks, N. Dak. 58201

[21] Appl. No.: 09/024,681

[22] Filed: Feb. 17, 1998

[51] Int. Cl.$^6$ ....................................................... B60G 7/00
[52] U.S. Cl. ............................... 280/79.7; 280/63; 414/11
[58] Field of Search .......................... 414/10, 11; 280/63, 280/79.7; 294/15, 26

[56] References Cited

U.S. PATENT DOCUMENTS

| | | | |
|---|---|---|---|
| 3,841,651 | 10/1974 | Bigney | 280/47.16 |
| 4,488,733 | 12/1984 | Hellsten | 280/79.3 |
| 4,630,838 | 12/1986 | Stockton | 280/79.7 |
| 5,765,843 | 6/1998 | Miller | 280/79.7 |
| 5,782,477 | 7/1998 | Covert | 280/79.7 |
| 5,820,145 | 10/1998 | Osowski | 280/79.7 |

FOREIGN PATENT DOCUMENTS

| | | | |
|---|---|---|---|
| 5-85363 | 4/1993 | Japan | 280/79.7 |
| 5-178429 | 7/1993 | Japan | 414/11 |

OTHER PUBLICATIONS

"Sheeting Material Cart", from Sporty's Tool Shop Catalog, Christmas 1995 version, Dec. 1995.

*Primary Examiner*—Christopher P. Ellis
*Assistant Examiner*—Douglas Hess
*Attorney, Agent, or Firm*—Robert E. Kleve

[57] ABSTRACT

The invention comprises a portable panel lifting and transporting device. The device has an elongated stick which is intended to be placed in an upright position. A channel member is mounted to the bottom of the stick and has a U shaped apex at its bottom and opposing inner and outer sides with the inner side formed in a triangular shape and fixed to the bottom of the stick and with the outside edge adapted to receive the bottom edge of a drywall panel whereby the bottom edge may rest in the apex bottom of the channel member. A pair of wheels in line with one another are mounted on the triangular side of the channel member for rotatably supporting the device and a handle is mounted to an upper portion of the stick for an operator to grasp and move the device along the ground on its rollers with a drywall panel resting in the channel member.

4 Claims, 1 Drawing Sheet

PORTABLE PANEL LIFT DEVICE

This invention relates to a small portable lifting apparatus. It is an object of the invention to provide a novel relatively small portable drywall lifting device which can be placed under a drywall panel and has a pair of rollers to facilitate rolling or moving the device along the ground with the drywall panel resting in a channel on the device to assist in moving the panel relatively short distances.

It is a further object of the invention to provide a novel compact panel lifting device having a channel at the bottom and a handle above the channel to enable an operator to lift a drywall panel when resting in the channel by lifting it with the handle.

It is a further object of the invention to provide a novel compact portable panel transporting device having a channel with a handle mounted above it with the channel acting to support the lower edge of a drywall panel and a pair of spaced front and rear wheels mounted to extend below the channel to enable the channel to be rolled along the ground with the drywall panel in the channel, by the operator grasping the handle to move the device.

Further objects and advantages of the invention will become apparent as the description proceeds and when taken in conjunction with the accompanying drawings wherein;

BRIEF DESCRIPTION OF PREFERRED EMBODIMENT

This invention comprises a portable panel lifting and transporting device which has an upright stick with a channel mounted at the bottom of the stick and a pair of wheels rotatably mounted to the channel and projecting beneath the channel for rotatably supporting the channel on the ground with the channel spaced above the ground when the wheels of the channel are rolled along the ground. The channel is adapted to receive the bottom edge of a conventional drywall panel thereon with the channel positioned preferably in the middle of the bottom edge of the drywall panel so that the apparatus may support the panel in the channel above the ground and the apparatus may be rolled on its wheels along the ground by the operator grasping the handle on the stick and moving the stick and channel on the wheels with the panel supported in the U shaped bottom of the channel of the apparatus.

BRIEF DESCRIPTION OF PREFERRED EMBODIMENT

Figure 1:
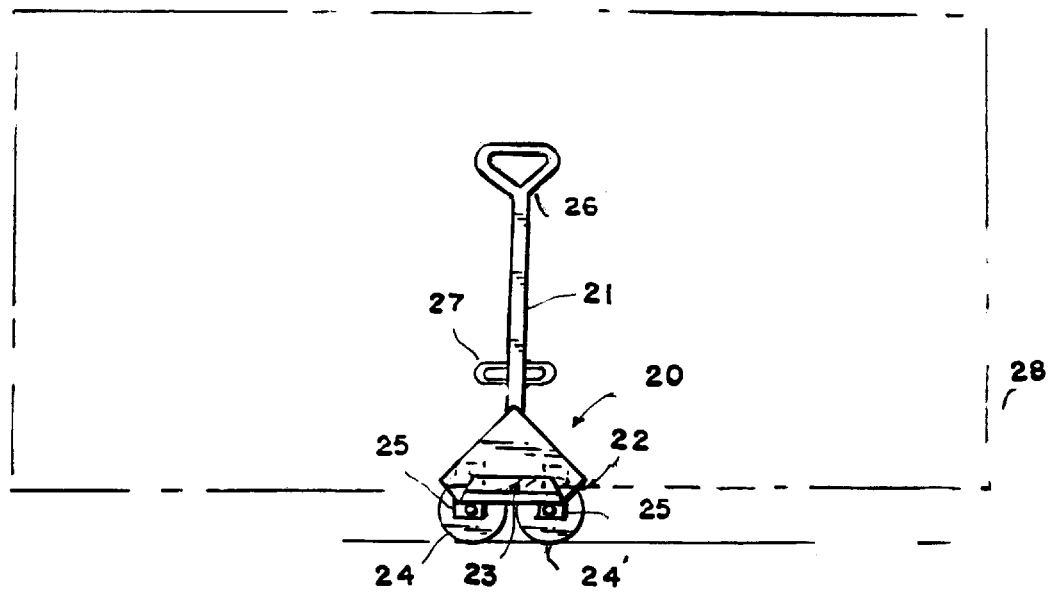
FIG. 1 is a front elevational view of the portable panel transporting and lifting device with a drywall panel shown mounted in the channel of the device and with the device shown in its upright position.
Figure 2:
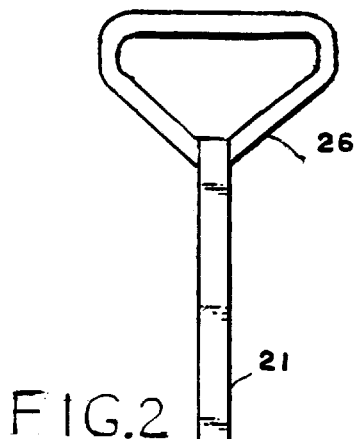
FIG. 2 is an enlarged front elevational view of the portable panel transporting and lifting device.

Referring more particularly to the drawings, in FIG. 1, the portable drywall panel lifting device 20 is illustrated having a main rod or stick 21 with a channel member 22 mounted to the bottom of the rod or stick. The channel member 22 has a triangular upper plate 23' and has opposing inclined bottom portions 22" and 22'" at its bottom, with an outside flange 23 at its outside edge outside of the triangular plate or face 23'. A pair of wheels 24 and 24' are rotatably mounted in line with one another along the triangular face of the channel member on a pair of plates 25 and the pair of plates 25 are fixed to the bottom of the triangular portion of the channel member. An upper and lower handle 26 and 27 are fixed to the rod or stick 21 in spaced relation to one another above the channel member 22. A drywall panel 28 may be placed with its bottom edge 28' resting in the bottom of the channel member as shown in FIG. 3.

OPERATION

Figure 3:
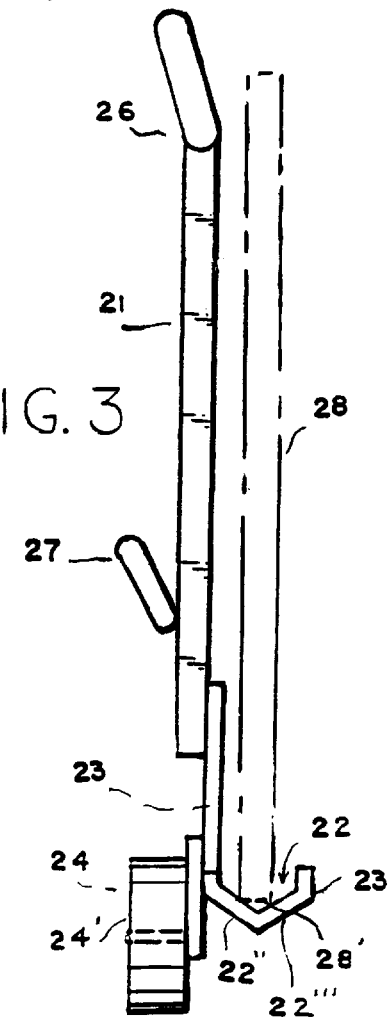
FIG. 3 is an enlarged side elevational view of the portable panel transporting and lifting device.

The drywall panel lifting device 20 will be operated by the operator placing a drywall panel 28 on the middle bottom edge 28' of a drywall panel 28 in the bottom of the channel 22 through the open top of the U shaped channel from the outside edge 23 of the channel opposite the wheels and the triangular face 23' of the channel, as illustrated in FIGS. 1 and 3. The operator will grasp the upper edge of the drywall panel 28 with one hand and one of the handles 26 or 27 with his other hand and roll the device 20 along the ground on its wheels 24 and 24', while balancing the drywall panel in the channel 22 and guiding the movement of the device. The operator may also use the upper handle 26, for example, to simply lift the device and the drywall panel with one hand while guiding the upper edge of the drywall panel with his other hand, and possibly carrying the device and panel and/or roll them along the ground.

Thus, it will be seen that a novel portable drywall lifting and moving device which can be easily and quickly used by one person to support a drywall panel on a pair of wheels and roll the device and the panel along the ground to move a drywall panel or two quickly from one location to another.

It will be obvious that various changes and departures may be made to the invention without departing from the spirit and scope thereof, and accordingly, it is not intended that the invention be limited to that specifically described in the specification or as illustrated in the drawings but only as set forth in the appended claims wherein:

What is claimed is:

1. A drywall panel transporting device comprising an elongated stick for positioning in an upright position, a triangular plate mounted at the bottom of the stick, said plate at its bottom forming a longitudinal extending channel forward of the triangular plate with opposed slanted sides in the channel and with the channel terminating in a forward upper edge a short distance upward from the bottom of the channel and open to the bottom of the channel, a pair of axles mounted directly beneath the channel of the plate, extending in parallel to one another laterally across the bottom of the channel, a single pair of wheels, one rotatably mounted to each axle, each of said axles and each of said wheels being longitudinally in line with one another and relatively closely longitudinally adjacent on each side of the triangular plate and vertical stick, said channel being adapted to receive and support a drywall panel along its bottom edge between the opposed slanted sides of the channel.

2. A drywall panel transporting device comprising an elongated stick for positioning in an upright position, a vertical plate mounted to the bottom of the vertical stick, said plate having a lower end forming a longitudinally extending channel with the lower end slanting laterally forward and downward and then slanting forward and upward and terminating with a lower edge a relatively short distance from the bottom of the channel to form an elongated channel providing an opening from the top to the bottom of the channel for receiving a drywall panel at its lower edge, two axles mounted to the channel beneath the bottom of the channel relatively closely adjacent to each side of said vertical stick and extending laterally across the channel, only two wheels mounted longitudinally in line with one another with one rotatably mounted to each axle on each side of said stick for rotatably supporting said device, said channel being adapted to receive and support a drywall panel along its bottom edge between the opposed slanted sides of the channel.

3. A drywall panel transporting device comprising an elongated stick for positioning in an upright position, a vertical plate mounted to the bottom of the stick, said plate having its lower end forming a longitudinally extending channel extending longitudinally across the stick, with the lower end slanting laterally forward and downward and then slanting laterally forward and upward to form opposed slanted sides to the channel with its lower end terminating in a lower edge a relatively short distance upward from the bottom of the channel and forming an opening from the top to the bottom of the channel, said channel being adapted to receive and support a drywall panel along its bottom end between the opposed slanted sides of the channel, two axles mounted adjacent the bottom of the channel extending across the channel on opposite sides of the stick, only two wheels for rotatably supporting said device with one rotatably mounted on one axle and the other rotatably mounted on the other axle, and with the wheels closely adjacent each other, one of each side of the stick.

4. A drywall panel transporting device according to claim 3, wherein said two axles are mounted to said channel directly beneath said channel.

* * * * *